(12) United States Patent
Pfister

(10) Patent No.: US 7,458,003 B2
(45) Date of Patent: Nov. 25, 2008

(54) LOW-COMPLEXITY, CAPACITY-ACHIEVING CODE FOR COMMUNICATION SYSTEMS

(75) Inventor: Henry David Pfister, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 324 days.

(21) Appl. No.: 11/001,595

(22) Filed: Nov. 30, 2004

(65) Prior Publication Data

US 2005/0135262 A1 Jun. 23, 2005

Related U.S. Application Data

(60) Provisional application No. 60/526,357, filed on Dec. 1, 2003.

(51) Int. Cl.
*H03M 13/00* (2006.01)
(52) U.S. Cl. ...................................... 714/758
(58) Field of Classification Search ................. 714/758
See application file for complete search history.

(56) References Cited

U.S. PATENT DOCUMENTS

| | | | |
|---|---|---|---|
| 5,446,747 A | 8/1995 | Berrou | |
| 6,307,487 B1 | 10/2001 | Luby | |
| 6,320,520 B1 | 11/2001 | Luby | |
| 6,373,406 B2 | 4/2002 | Luby | |
| 6,567,465 B2 * | 5/2003 | Goldstein et al. | ........... 375/222 |
| 6,614,366 B2 | 9/2003 | Luby | |
| 6,633,856 B2 * | 10/2003 | Richardson et al. | ........... 706/15 |
| 7,058,873 B2 * | 6/2006 | Song et al. | ................... 714/752 |
| 7,089,477 B1 * | 8/2006 | Divsalar et al. | ............. 714/755 |
| 7,116,710 B1 * | 10/2006 | Jin et al. | ....................... 375/240 |
| 7,162,684 B2 * | 1/2007 | Hocevar | ...................... 714/800 |
| 2005/0149845 A1 * | 7/2005 | Shin et al. | .................... 714/801 |
| 2006/0123277 A1 * | 6/2006 | Hocevar | ...................... 714/704 |
| 2006/0218460 A1 * | 9/2006 | Divsalar et al. | ............. 714/755 |
| 2007/0011568 A1 * | 1/2007 | Hocevar | ...................... 714/758 |
| 2007/0022354 A1 * | 1/2007 | Yu et al. | ....................... 714/755 |
| 2007/0025450 A1 * | 2/2007 | Jin et al. | ....................... 375/242 |

OTHER PUBLICATIONS

Chung et al., "On The Design Of Low-Density Parity-Check Codes Within 0.0045 Db Of The Shannon Limit," *IEEE Commun. Letters*, vol. 5, No. 2, Feb. 2001, pp. 58-60.
Gallager, "Low-Density Parity-Check Codes," *Research Monograph 21, The M.I.T. Press*, Cambridge, MA, U.S.A., Jul. 1963, 90 pages.
Jin et al., "Irregular Repeat-Accumulate Codes," In *Proc. Int. Symp. on Turbo Codes & Related Topics*, Brest, France, Sep. 2000, 8 pages.
Luby et al., "Practical Loss-Resilient Codes," In *Proc. of the 29th Annual ACM Symp. on Theory of Comp.*, 1997, pp. 150-159.

(Continued)

*Primary Examiner*—Rehana Perveen
*Assistant Examiner*—Sam Rizk
(74) *Attorney, Agent, or Firm*—Thomas Rouse; Kenneth K. Vu

(57) ABSTRACT

Methods and apparatuses to encode and decode information. One apparatus may use an encoder with a relatively low complexity, capacity-achieving code. The code may allow information to be reliably transmitted and received across a noisy medium or channel.

48 Claims, 9 Drawing Sheets

OTHER PUBLICATIONS

Richardson et al., "The Capacity Of Low-Density Parity Check Codes Under Message-Passing Decoding," *IEEE Trans. Inform. Theory*, vol. 47, No. 2, Feb. 2001, pp. 599-618.

Shokrollahi, "New Sequences Of Linear Time Erasure Codes Approaching The Channel Capacity," In *Applicable Algebra in Eng., Commun. Comp.*, 1999, pp. 65-76.

P.Elias, "Coding for two noisy channels," in *Information Theory, Third London Symposium*, 1955, pp. 61-67.

A. Khandekar, "Graph-based codes and iterative decoding," PhD dissertation, California Institute of Technology, Pasadena, CA 2002, pp. 1-103.

A. Khandekar and R.J. McEliece, "On the complexity of reliable communication on the erasure channel," *Proceedings 2001 IEEE International Symposium on Information Theory (ISIT2001)*, Washington, D.C., Jun. 2001, p. 1.

M.G. Luby et al., "Efficient erasure correcting codes," *IEEE Trans. on Information Theory*, vol. 47 Feb. 2001, pp. 569-584.

Henry D. Pfister, On the Capacity of Finite State Channels and the Analysis of Convolutional Accumulate-m Codes. PhD thesis, University of California, San Diego, CA, Mar. 2003, pp. 1-188.

P. Oswald and A. Shokrollahi, "Capacity-achieving sequences for the erasure channel," *IEEE Trans. on Information Theory*, vol. 48, No. 12, Dec. 2002, pp. 3017-3028.

I. Sason and R. Urbanke, "On the complexity of irregular repeat-accumulate codes on the erasure channel," *Proceedings of the Third International Symposium on Turbo Codes and related Topics*,Brest, France, Sep. 1-5, 2003, pp. 133-136.

I. Sason and R. Urbanke, "Parity-Check Density versus Performance of Binary Linear Block Codes over Memoryless Symmetric Channels," *IEEE Trans. on Information Theory*, vol. 49, No. 7, Jul. 2003, pp. 1611-1635.

A. Shokrollahi, "New sequences of time erasure codes approaching channel capacity," *Proceedings of the 13th International Symposium on Applied Algebra, Algebraic Algorithms and Error-Correcting Codes*, Lectures Notes in Computer Science 1719, Springer Verlag, 1999, pp. 65-76.

\* cited by examiner

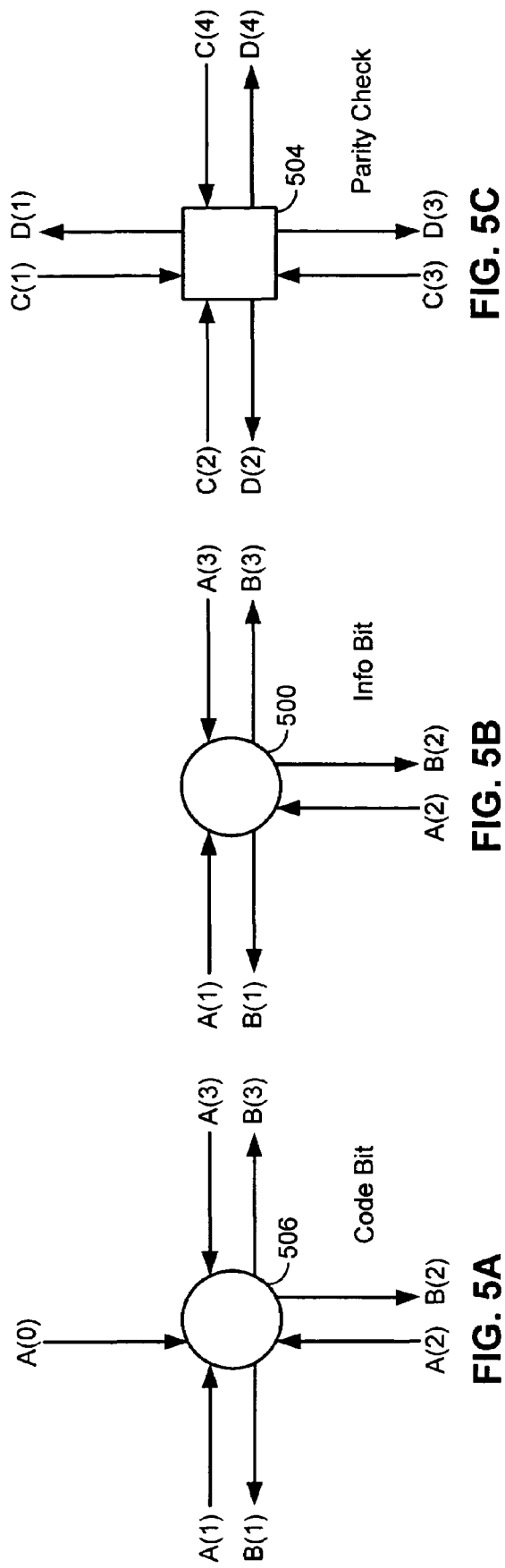

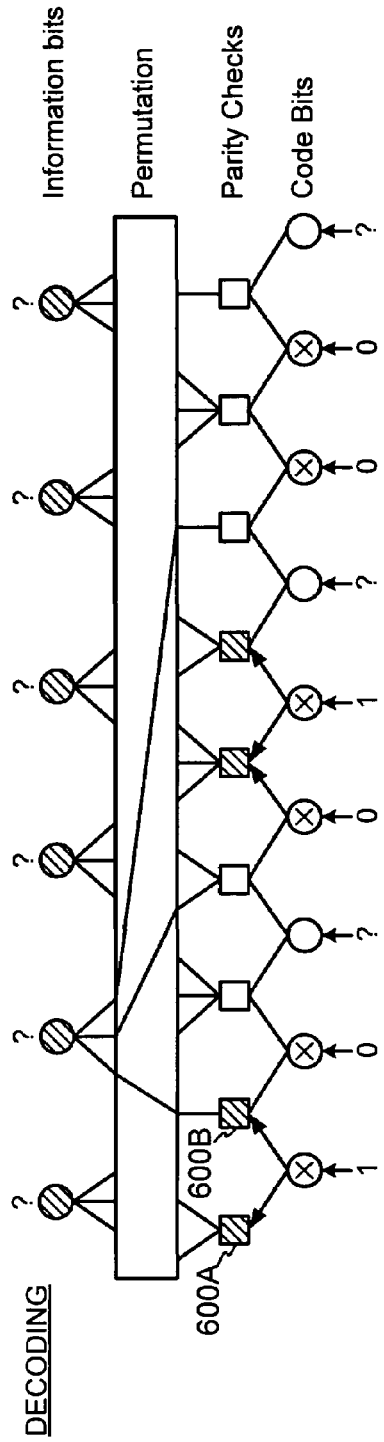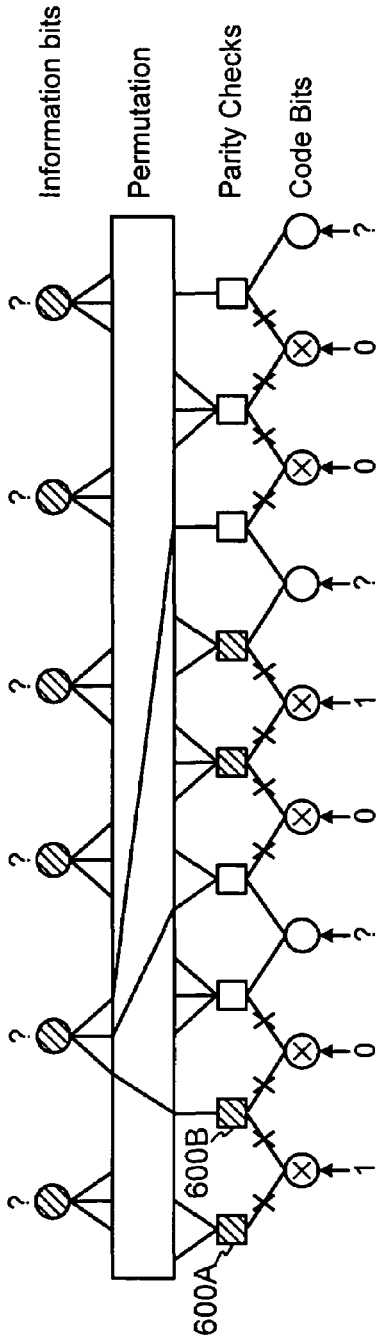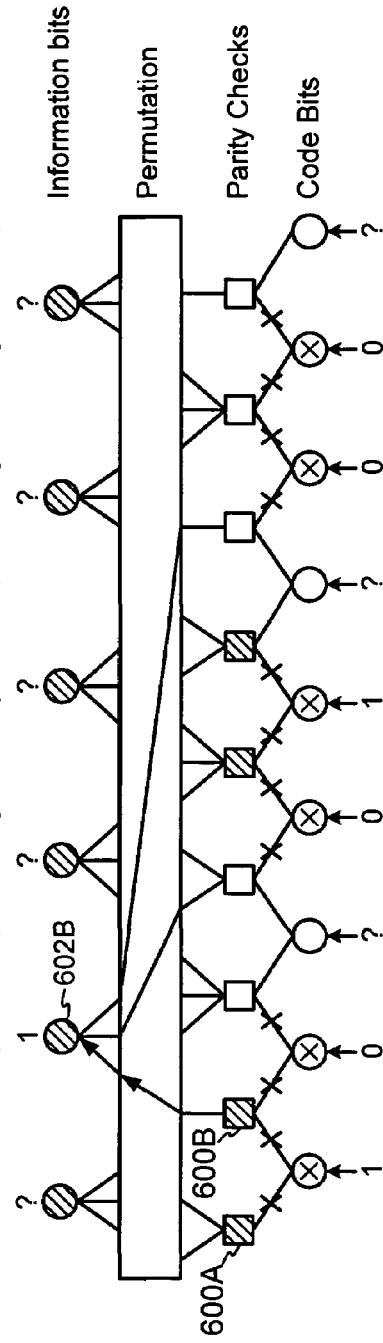

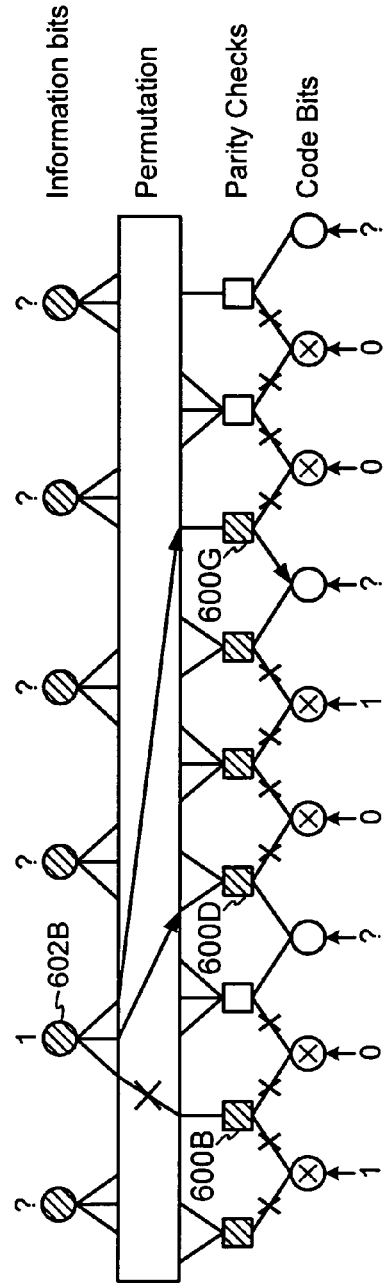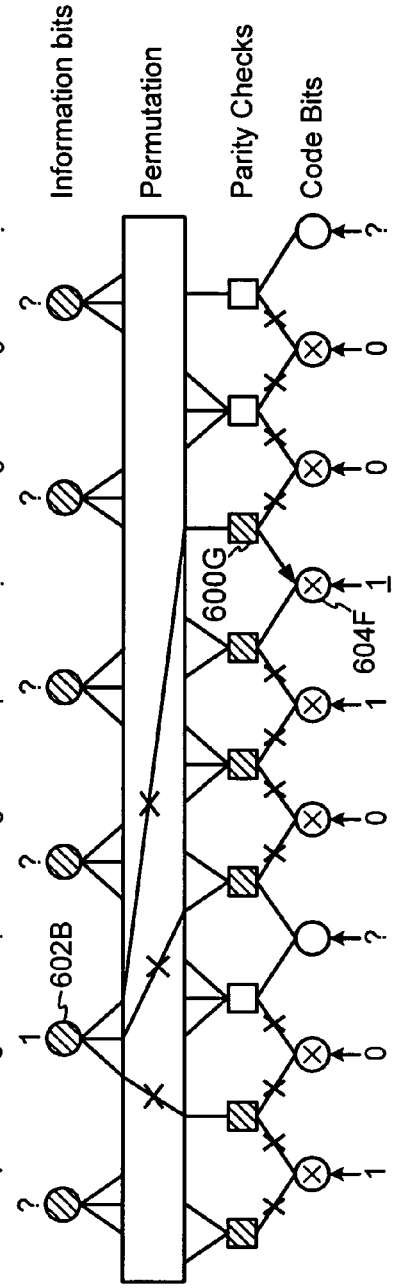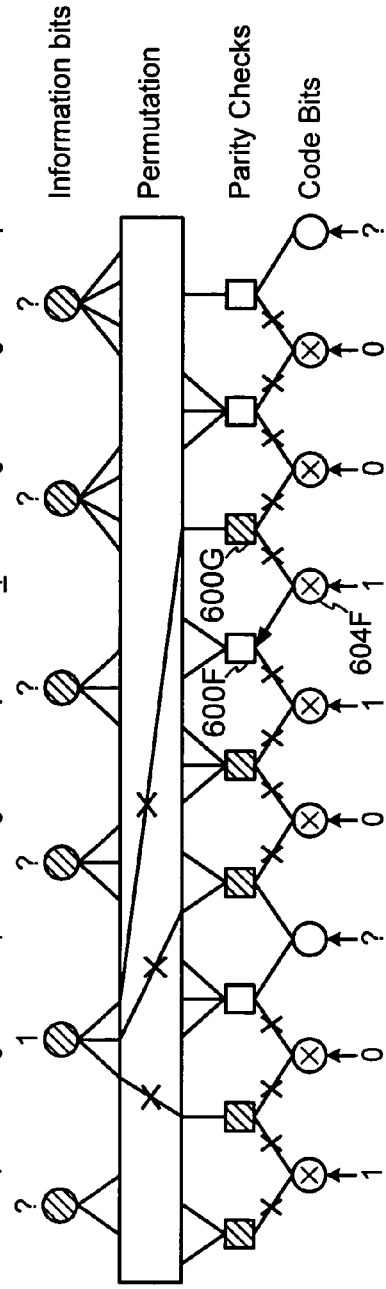

LOW-COMPLEXITY, CAPACITY-ACHIEVING CODE FOR COMMUNICATION SYSTEMS

CLAIM OF PRIORITY UNDER U.S.C §119

This application claims priority to co-assigned U.S. Provisional Application No. 60/526,357, entitled "Low-Complexity Capacity-Achieving Code for Communication Systems," filed on Dec. 1, 2003, which is incorporated by reference.

BACKGROUND

1. Field

The present invention relates generally to communication systems, and more specifically to encoding information and decoding information.

2. Background

Many modern digital communication systems use error-correcting codes (ECCs) to improve performance gains. An ECC encoder encodes a block of k message bits into a block of n code bits (where n>k) to transmit. The number of k message bits transmitted per n code bits is known as the "code rate," which is expressed as r=k/n. The code rate determines the efficiency of a coding scheme. The maximum achievable (largest) code rate that allows messages to be reliably transmitted across a particular noisy communication channel is known as the "channel capacity."

A plurality of information bits may be grouped together to form symbols or packets, which may be processed and transmitted across a channel.

SUMMARY

A design goal of an error-correcting code (ECC) is to operate as close to capacity as possible, i.e., use the highest code rate possible that guarantees reliable communication. The complexity of encoding and decoding an ECC may increase system cost. Thus, another design goal of an ECC is to have low-complexity encoding and decoding methods.

The present invention relates to methods and apparatuses for encoding information and decoding information. One apparatus may use an encoder with a relatively low complexity, capacity-achieving code. The code may allow information to be reliably transmitted and received across a noisy medium or channel.

One embodiment of the codes described herein may have two major advantages over previous code designs. One advantage is the codes' decoding complexity, which may be much lower than other coding methods when the code rate approaches the channel capacity. More specifically, the per-bit decoding complexity on a binary erasure channel (BEC) remains bounded as the gap to capacity vanishes. In comparison, previous code constructions that achieve capacity on a BEC have a per-bit decoding complexity that becomes infinite as the gap to capacity vanishes.

Another advantage is the minimum information bit degree in the decoding graph may be greater than two, e.g., three. Therefore, these codes may be unconditionally stable, have fewer problems with low-weight code words, and do not suffer from error floor problems caused by degree two bit nodes.

One aspect relates to a method of configuring an information encoder. The method comprises: for a plurality of information nodes, selecting a number of outputs for each information node, wherein a total number of outputs from the information nodes is greater than a total number of information nodes; selecting a permutation for the outputs of the information nodes to reach inputs of a plurality of parity check nodes, wherein a total number of information node outputs is equal to a total number of parity check node inputs; and selecting a number of inputs for each parity check node, wherein at least two parity check nodes have an unequal number of inputs.

Another method comprises inputting a plurality of information symbols to a plurality of information nodes, one symbol per information node, where each symbol comprises at least one bit; at each information node, outputting the information symbol one or more times, wherein a total number of outputs from the information nodes is greater than a total number of information nodes; transferring the outputs of the information nodes to a plurality of parity check nodes, wherein a total number of information node outputs is equal to a total number of parity check node inputs, wherein at least two parity check nodes have an unequal number of inputs; and outputting values from the plurality of parity check nodes.

Another aspect relates to an apparatus comprising an encoder configured to encode a plurality of information symbols to code symbols. The encoder is configured to: receive a plurality of information symbols at a plurality of information nodes, one symbol per information node, where each symbol comprises at least one bit; at each information node, output the information symbol one or more times, wherein a total number of outputs from the information nodes is greater than a total number of information nodes; transfer the outputs of the information nodes to a plurality of parity check nodes, wherein a total number of information node outputs is equal to a total number of parity check node inputs, wherein at least two parity check nodes have an unequal number of inputs; and output code symbols from the plurality of parity check nodes.

BRIEF DESCRIPTION OF THE DRAWINGS

FIGS. 5A-5C illustrate a log-likelihood ratio (LLR) decoding example.

FIGS. 6A-6F illustrate a decoding example.

DETAILED DESCRIPTION

Information and signals may be represented using any of a variety of different technologies and techniques. For example, data, instructions, commands, information, signals, bits, symbols, and chips may be referenced by voltages, currents, electromagnetic waves, magnetic fields or particles, optical fields or particles, or any combination thereof.

A digital signal may represent, for example, an image signal, a sound signal, a data signal, a video signal, or a multiplex of different signals. A digital signal, whatever its origin, may be coded and decoded. For example, U.S. Pat. No. 6,307,487 describes a coding and decoding system.

The embodiments described herein may be applied to any type of transmission, by radio frequency or by cable. One field of application is digital information transmission with a certain degree of reliability on highly noise-ridden channels. For example, the embodiments may be implemented for the transmission and reception of signals by satellite or wireless communication systems. The embodiments may also be used for spatial transmission towards or between spaceships and/or space probes and, more generally, whenever the reliability of the decoding is of vital importance.

Figure 1:
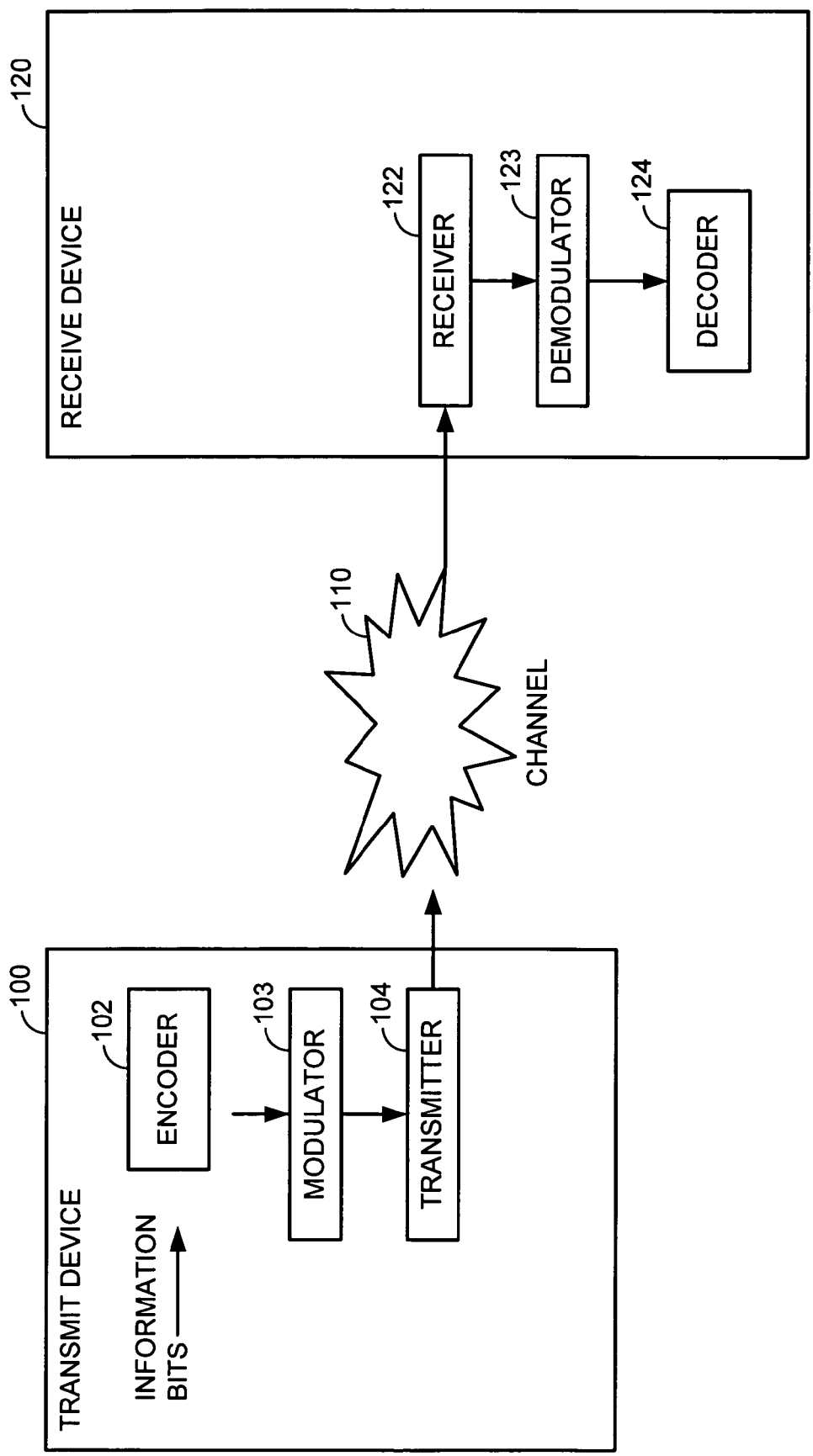
FIG. 1 illustrates a system with a transmit device and a receive device.

FIG. 1 illustrates a system with a transmit device 100 and a receive device 120, which communicate via a medium or channel 110. The channel 110 may be a real-time channel, such as a path through the Internet or a broadcast link from a television transmitter to a television recipient or a telephone connection from one point to another.

Alternatively, channel 110 may be a storage channel, such as a CD-ROM, disk drive, Web site, or the like. Channel 110 might even be a combination of a real-time channel and a storage channel, such as a channel formed when one person transmits an input file from a personal computer to an Internet Service Provider (ISP) over a telephone line. The input file is stored on a Web server and is subsequently transmitted to a recipient over the Internet.

The transmit device 100 comprises an encoder 102, a modulator 103 and a transmitter 104. The receive device 120 comprises a receiver 122, a demodulator 123, and a decoder 124. The transmit device 100 and the receive device 120 may comprise other elements in addition to or instead of the elements shown in FIG. 1.

In one embodiment, the transmit device 100 may be a wireless communication device (also called a remote unit, an access terminal, a subscriber unit, etc.), such as a mobile phone, lap top computer, or personal digital assistant (PDA). The receive device 120 may be a base station in a communication system, such as a code division multiple access (CDMA) system. In another embodiment, the transmit device 100 may be a base station in a communication system, and the receive device 120 may be a wireless communication device.

The encoder 102 and decoder 124 may use a novel, low complexity, error-correcting code (ECC) to encode and decode data. The code may achieve capacity of a binary erasure channel (BEC), such as the channel 110, with modest (bounded) complexity. A BEC can erase a code bit with probability p and can then transmit the correct value with probability 1−p. A decoding method for this code may have a particularly simple form for a BEC.

Desirable properties of a code may apply to other channels as well, as described in "On the design of low-density parity-check codes within 0.0045 dB of the Shannon limit" by Sae-Young Chung, G. David Forney, Jr., Thomas J. Richardson, and Rüdiger L. Urbanke, *IEEE Commun. Letters*, 5(2): 58-60, February 2001. The code described herein is not limited to a BEC and may be used to improve communications on many other channels. Codes with desirable properties for a BEC may also be desirable for any packet erasure channel, such as an Internet packet loss channel.

Code Structure

Encoding and decoding of the code described herein may be understood via message passing on a sparse bipartite graph, which is described in "Low-density parity-check codes" by Robert G. Gallager, *Research Monograph* 21, The M.I.T. Press, Cambridge, Mass., USA, 1963 and "The capacity of low-density parity check codes under message-passing decoding" by Thomas J. Richardson and Rüdiger L. Urbanke, *IEEE Trans. Inform. Theory*, 47(2):599-618, February 2001.

One embodiment of an error-correcting code (or sequence of codes) described herein may be a non-systematic, irregular repeat-accumulate (IRA) code.

Figure 2A:
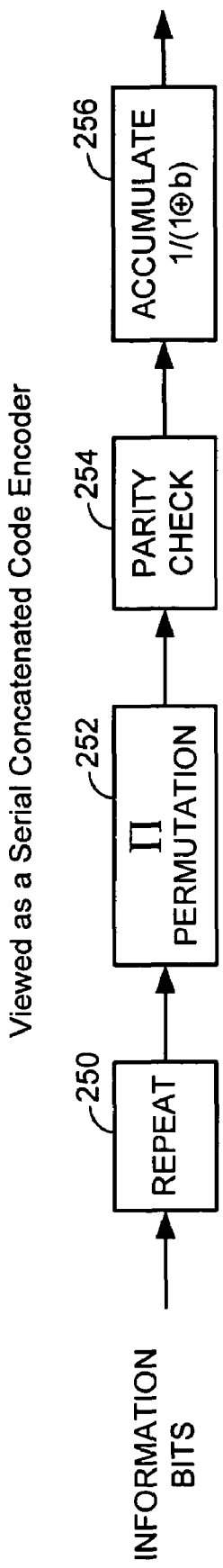
FIG. 2A shows an encoding process, which may be used by the system of FIG. 1.

FIG. 2A shows an encoding process, which may be used by the system of FIG. 1, as viewed as a serial concatenated code. Information bits are input to a repeat unit 250, which repeats one or more of the information bits. A permutation unit 252 permutates the order (e.g., randomly selects an order) of the information bits and repeated information bits. A parity check unit 254 generates output bits based on selected information bits and repeated information bits. An accumulation unit 256 accumulates the output bits from the parity check unit 254.

Figure 2B:
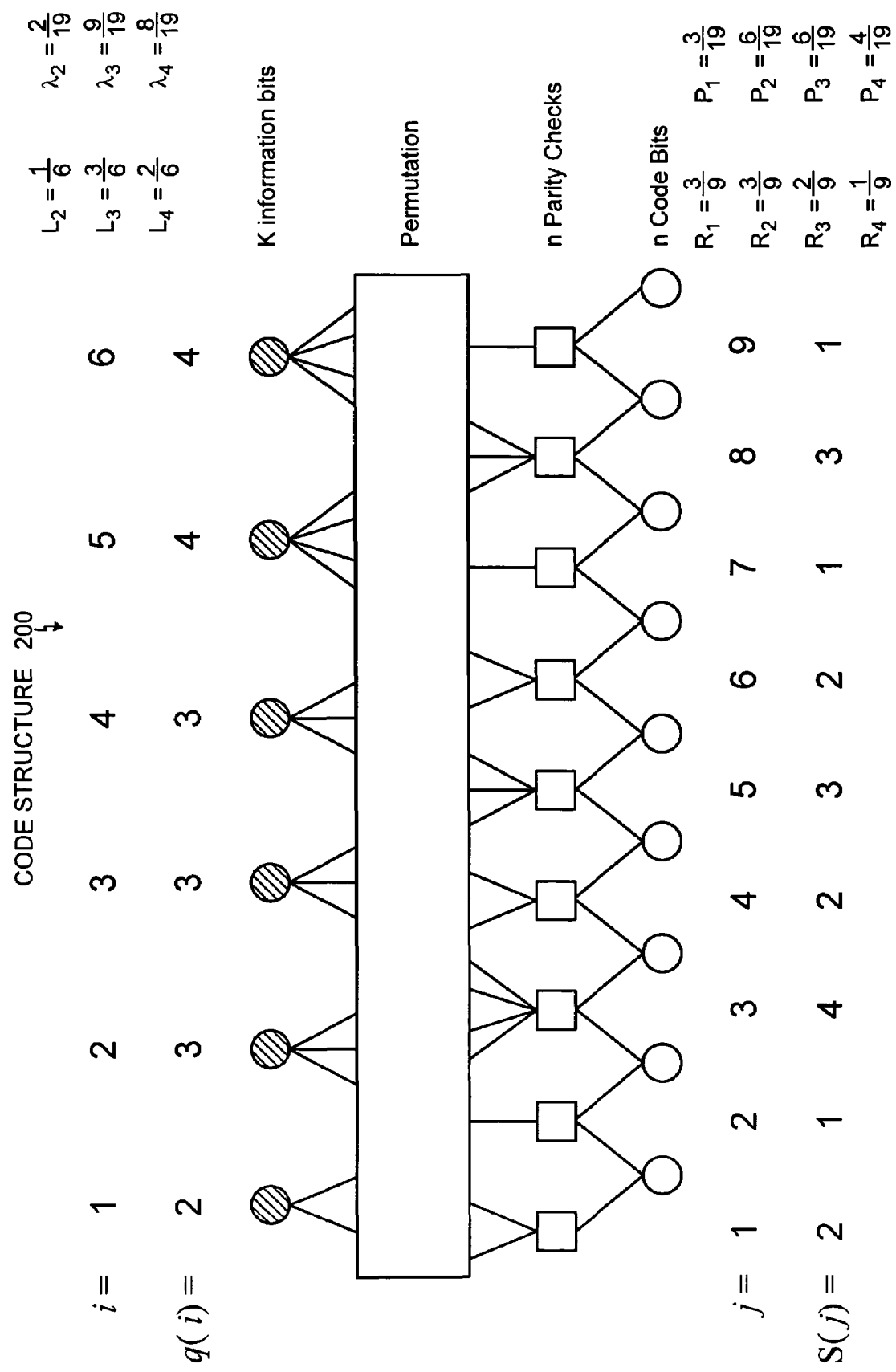
FIG. 2B shows one embodiment of an error correction code (ECC) structure, which may be used by the system of FIG. 1.

FIG. 2B shows one embodiment of an error correction code (ECC) structure 200, which may be used by the system of FIG. 1. There are k information bit nodes (top shaded circles), which correspond to k information bits. Although only 6 information bit nodes are shown, there may be any k number of information bit nodes. Each information bit node has one or more edges (or lines, connections, paths) connected through a random or pseudo-random permutation to one or more parity-check nodes (squares). Pseudo-random refers to a distribution that is not completely random but resembles a random distribution. There are n parity-check nodes (squares) and n code bit nodes (bottom white circles), which correspond to n code bits.

The code structure 200 comprises both deterministic elements and a random or pseudo-random element. The deterministic elements are the information bit and parity-check degrees, i.e., the number of edges (lines) attached to each circle and square. The random element (or permutation) is mapping between edges at each layer, i.e., exactly which information bit node is attached to which edge of a parity check node.

Let q(i) be a number of edges (or lines) attached to an information bit node i for $1 \leq i \leq k$. Let s(j) be a number of edges emanating upwards from a parity check node j (for $1 \leq j \leq n$). Let E be the total number of edges attaching the information bit nodes to the parity-check nodes, such that:

$$E = \sum_{i=1}^{k} q(i) = \sum_{j=1}^{n} s(j)$$

In FIG. 2B, E is equal to 19, but other embodiments may use other values of E.

Consider the lth edge of the jth parity-check node (numbered from left to right), and let t(j, l) represent a number of the information bit node to which this lth edge attaches (for $1 \leq j \leq n$ and $1 \leq l \leq s(i)$). These parameters (q(i), s(j), and t(j, l)) may define the entire structure of the code. The code bit nodes at the bottom of FIG. 2B may be attached to the parity-check nodes in a zigzag pattern.

Encoder

The encoder 102 may transform k information bits into n code bits using the following method. The information bits may be denoted by u(1), . . . , u(k). The code bits may be denoted by x(1), . . . , x(n). Both information bits and code bits can be taken from the binary alphabet {0,1}. The encoder 102 may compute the code bits recursively using a formula:

$$x(j) = \left[x(j-1) + \sum_{l=1}^{s(j)} u(t(j,l))\right] \bmod 2,$$

where x(0)=0 by convention.

After encoding, all information bits and code bits are known. A "true value" of each edge may be defined to be the value of the bit node (either information bit node or code bit node) to which the edge attaches. This value is unique because each edge attaches to only one bit node (either information bit node or code bit node), and all edges in FIG. 2B connect bit nodes (information bit nodes or code bit nodes) to parity-check nodes.

Figure 3:
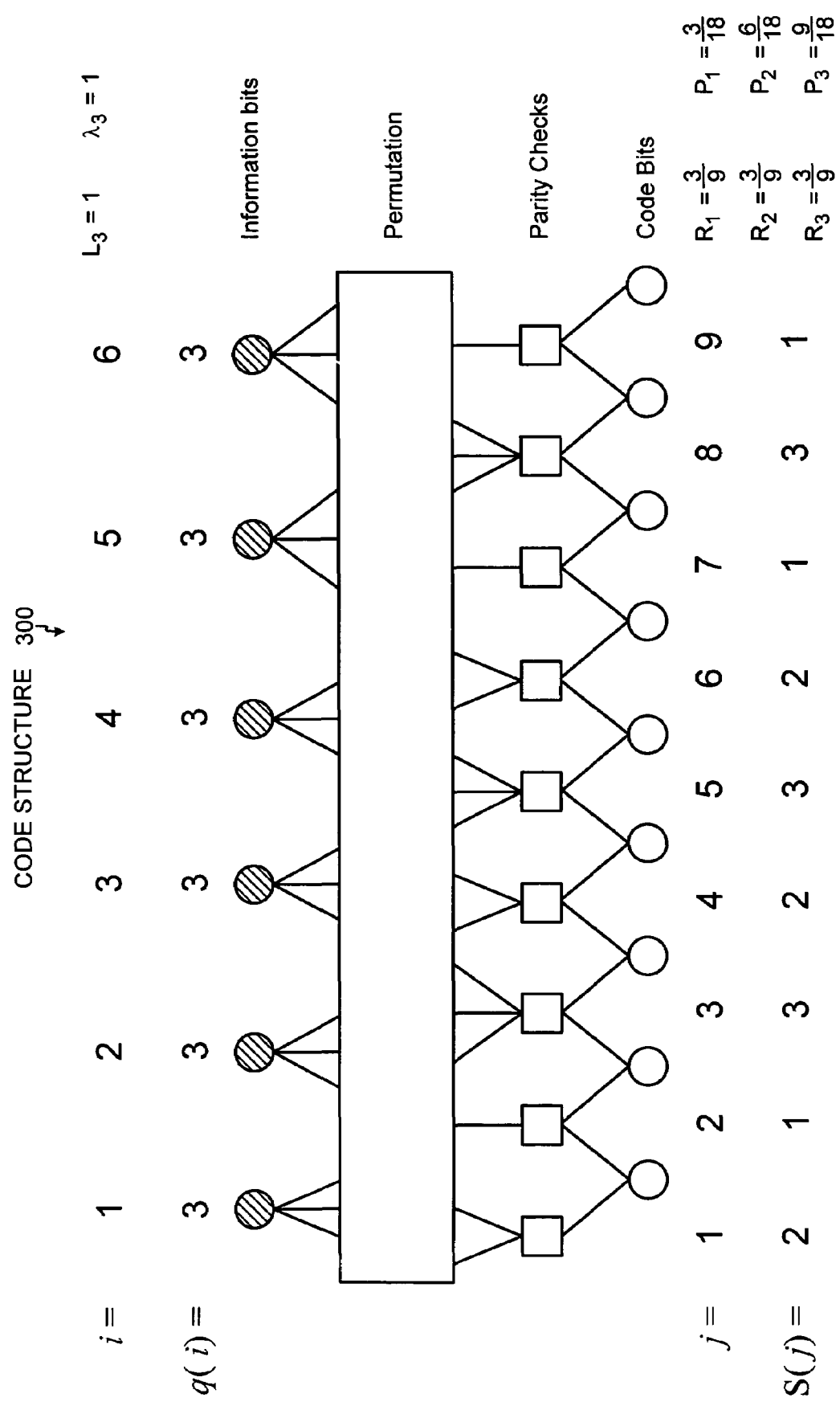
FIG. 3 illustrates another embodiment of a code structure.

FIG. 3 illustrates another embodiment of a code structure 300, where all information bit nodes have an equal number of edges, e.g., each information bit node has three edges.

Figure 4:
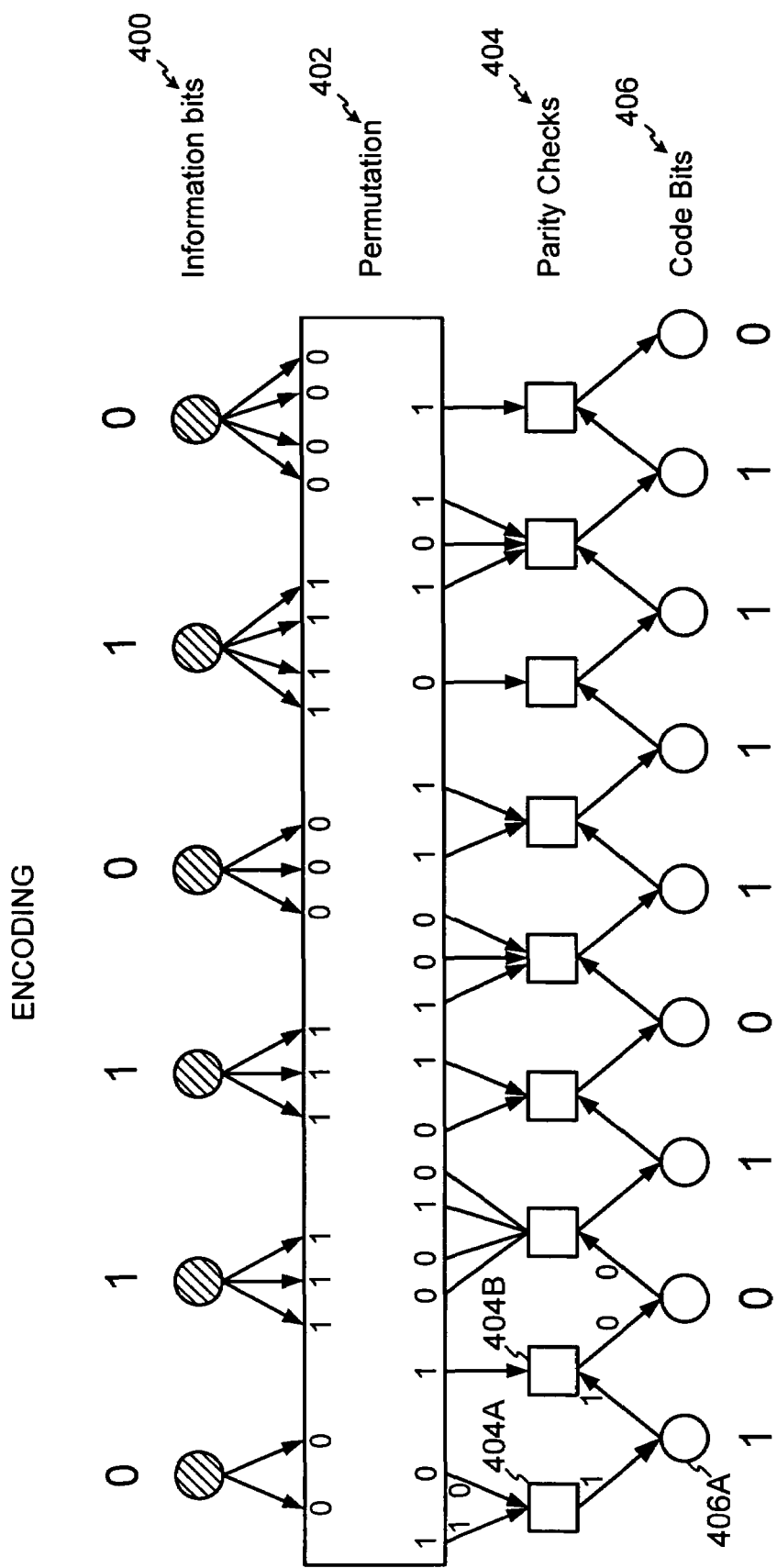
FIG. 4 illustrates an example of encoding a sequence of information bits to code bits.

FIG. 4 illustrates an example of encoding a sequence of six information bits (0, 1, 1, 0, 1, 0) to nine code bits (1, 0, 1, 0, 1, 1, 1, 1, 0). The arrows in FIG. 4 illustrate directions of binary values being passed from information bit nodes to the permutation block 402 to the parity check nodes 404 to the code bit nodes 406. The permutation block 402 may provide random permutation or pseudo-random permutation of values from the information bit nodes 400 to the parity check nodes 404. Once a permutation is selected, the encoder 102 and decoder 124 will use the same permutation.

Each parity check node 406 receives one or more inputs from the permutation block 402 and outputs a value to a code bit node 406. For example, the first parity check node 404A receives a 1 and a 0 from the permutation block 402 and outputs a 1. An even parity-check node is represented by an empty square, where all edges entering the even parity check node from the bottom and/or top should sum (modulo-2) to zero.

Each code bit node 406 (such as 406A) receives a value from a parity check node 404 (such as 404A) and may output its value to another parity check node 404 (such as 404B).

Decoder

A decoding method for the ECC described herein may be based on FIG. 2B (see also FIGS. 5A–5C and 6), which may be called a decoding graph. The goal of decoding may be to recover all information bits from a subset of code bits. Each bit node (i.e., circle) in FIG. 2B may represent an "equality constraint," where all edges entering a bit node must have the same (equal) true value.

There are two types of parity constraints: even parity and odd parity. An even parity-check node is represented by an empty square, where all edges entering the even parity check node from the bottom and/or top should sum (modulo-2) to zero. An odd parity-check node is represented by a filled square, where all edges entering the odd parity check node from the bottom and/or top should sum (modulo-2) to one. By definition, every codeword in the code is a binary sequence that satisfies all of these constraints.

If symbols (e.g., 00, 01, 10, 11) are used instead of bits, then there may be a plurality of parity constraint types. In this case, each type corresponds to all edges (e.g., A, B, C) entering the parity check summing to a particular value (e.g., D, i.e., A +B +C=D).

A channel model used herein may specify that each code bit is observed as transmitted across a noisy channel. This observation may be used to initialize the code bits. After initialization, the message-passing decoder 124 may allow each node in FIG. 2B to act as a separate processor, which receives messages, processes them, and then sends new messages. The decoding process may either terminate with a valid codeword or may be stopped after a fixed number of iterations.

Decoding Data From a Binary Erasure Channel

The BEC may have particularly simple message passing rules because each bit is either known or unknown, and a "known" bit is never in error. The decoder 124 may operate by removing edges from the graph in FIG. 2B and iteratively computing the original information bits. If the true value of any edge entering a bit node is known, then the equality constraint says that the true values of all edges entering that bit node are known because they must all be equal. If the true values of all but one of the edges entering a check node are known, then the even-parity constraint may be used to compute the true value of the last edge because it must equal the modulo-2 sum of all of the known edges. These two rules can be iteratively applied to the graph until the true values of all edges are known.

The decoding method may be described as a graph reduction by using odd and even parity-check nodes.

FIGS. 6A-6F illustrate a decoding example with a received sequence of code bits (1, 0, ?, 0, 1, ?, 0, 0, ?), where "?" represents code bits erased by the channel 110. The decoding method may first perform "initialization." In FIG. 6A, for each code bit received from the channel 110 (i.e., each bit that is not erased by the channel 110), if the code bit is a 1, the method toggles the color of each parity-check node attached to the code bit node (i.e., changing even-parity <->odd-parity). For example, the method changes the color of the first two parity check nodes 600A, 600B from empty to filled because the first code bit is a 1.

For both 1 and 0 received code bits, the method then deletes all edges attached to the known code bit nodes, as shown by the "Xs" in FIG. 6B.

The decoding method may then perform "iteration," as shown in FIG. 6C. For each parity check node with only one remaining edge (such as parity check node 600B in FIGS. 6B and 6C), the value of the only connected bit node (code or information bit node) is 0 if the check node is an even-parity constraint (empty square) and 1 if the check node is an odd-parity constraint (filled square). Thus, the information bit node 602B connected to filled parity check node 600B is a 1. The method sets the connected bit node (e.g., information bit node 602B) to its correct value (1) and deletes the edge, as shown in FIG. 6D.

If the value of the bit is a 1, the method toggles the color of each parity-check node attached to the bit node (information or code bit node), i.e., change even-parity <->odd-parity. Thus, since information bit node 602B is connected to parity check nodes 600D and 600G, the 1 from information bit node 602B changes the color of parity check nodes 600D and 600G from empty to filled. The method deletes all edges attached to the known bit node 602B, as shown in FIG. 6E.

After the edge between information bit node 602B and parity check node 600G is deleted, parity check node 600G has only one edge remaining: the edge connected to code bit 604F. Following the iteration method described above, the code bit node 604F is set to 1, as shown in FIG. 6E, and the edge between parity check node 600G and code bit node 604F is deleted, as shown in FIG. 6F.

The 1 at code bit node 604F causes the color of parity check node 600F to toggle from filled to empty, as shown in FIG. 6F. Then the edge between code bit node 604F and parity check node 600F is deleted.

The decoding method may then perform "termination." When there are no parity-check nodes with only a single edge remaining, the method may terminate. If all edges in the decoding graph have been deleted, then decoding was successful, and all bit node values (information bits and code bits) are known. Otherwise, some bits remain unknown, as shown in FIG. 6F, as decoding was unsuccessful.

Decoding data from General Channels

In contrast to binary erasure channels, decoding for general channels may require more complex messages to be passed between the nodes in the graph. These messages may represent a probability that the true value of an edge is a 0 or a 1. Representing this probability as a log-likelihood ratio (LLR) usually leads to a simpler decoder. Assume the transmitter 104 transmits a code bit X, which is equally probable to be 0 or 1, and a channel output Y is observed at the receiver 122. In this case, the LLR may be defined as:

$$LLR(X) = \log \frac{Pr(Y \mid X = 0)}{Pr(Y \mid X = 1)}.$$

The channel statistics, $Pr(Y|X)$, may be estimated from channel output by the receive device 120. The decoding method may proceed by passing LLR messages around the decoding graph.

FIGS. 5A-5B illustrate a log-likelihood ratio (LLR) decoding example. The decoding method may first perform "initialization." In FIG. 5A, the LLR of each code bit 506 may be computed from channel observations. In FIG. 5B, the LLR of each information bit 500 may be set to 0 (i.e., bit is equiprobably 0 or 1). The LLR of each edge may be set to the value of its adjacent bit node.

The decoding method may then perform "check node iteration." Each check node 504 has s edges, and $C(1), \ldots, C(s)$ represent the LLRs of the input messages.

The LLRs of the output messages, denoted by $D(1), \ldots, D(s)$, may be represented as:

$$D(j) = f\left(\sum_{i=1, i \neq j}^{s} f(C(i))\right) \text{ where}$$

$$f(x) = -\log\left(\tanh\left(\frac{x}{2}\right)\right).$$

The decoding method may then perform "bit node iteration." As shown in FIG. 5A, each code bit node 506 has q edges, and $A(1), \ldots, A(q)$ represent the LLRs of the input messages. The intrinsic LLR received from the channel 110 for a code bit node 506 may be represented as $A(0)$ for information bits $A(0)=0$. The LLRs of the output messages, denoted by $B(1), \ldots, B(q)$, may be expressed as $B(j)=B-A(j)$, where $$B = \sum_{i=0}^{s} A(i).$$

A hard decision (decision to either one or zero) for this bit may be given by the sign (positive or negative) of B and may be output or stored.

The decoding method may then perform "termination." If the hard decision bits satisfy all of the code constraints, then the method found a codeword and can terminate successfully. If a codeword has not been found, and a maximum number of iterations is exceeded, then the method terminates unsuccessfully.

Optimizing the Code Structure

One aspect of the invention relates to choosing the values of $q(i)$ and $s(j)$. Let $L_m$ be a fraction of information bit nodes with m edges, as shown in FIG. 2B. Let $R_t$ be a fraction of parity check nodes with t edges attached to the information bit nodes, as shown in FIG. 2B. Mathematically, these fractions can be expressed as:

$$L_m = \frac{|\{i|q(i) = m\}|}{k}$$

which is equal to the number of i's in the set $1 \leq j \leq k$ such that $q(i)=m$ and $$R_t = \frac{|\{j|s(j) = t\}|}{n}$$

which is equal to the number of j's in the set $1 \leq j \leq n$ such that $s(j)=t$. A method is now described for choosing optimal values for $R_t$ given a particular choice of the $L_m$. First, degree distribution polynomials for $R_t$ and $L_m$ may be defined as:

$$R(x) = \sum_{t \geq 1} R_t x^t \text{ and}$$

$$L(x) = \sum_{m \geq 1} L_m x^m.$$

Edge-perspective degree distribution polynomials may be expressed as:

$$\rho(x) = R'(x)/R'(1) \text{ and}$$

$$\lambda(x) = L'(x)/L'(1),$$

as shown in FIG. 2B. $R'(x)$ is the derivative of $R(x)$, and $L'(x)$ is the derivative of $L(x)$:

$$R'(x) = \sum_{t \geq 1} t R_t x^{t-1}$$

$$L'(x) = \sum_{m \geq 1} m L_m x^{m-1}.$$

Using these polynomials, an optimal $R(x)$ for the BEC may be written as $$R^{opt}(x) = \frac{1}{p} \frac{\frac{p}{1-p} h(x)}{1 + \frac{p}{1-p} h(x)}, \text{ where}$$

$$h(x) = \frac{\int_0^x (1 - \lambda^{-1}(1-t)) dt}{\int_0^1 (1 - \lambda^{-1}(1-t)) dt}.$$

The power series expansion of $R^{opt}(x)$ may be found using a program such as Mathematica, which can manipulate symbolic mathematics. Appendix B lists one embodiment of a computer program for Mathematica configured to implement a code described herein.

If $q(i)=q$ for $1 \leq i \leq k$ (i.e., $q(i)$ is a set number for all information bit nodes), then the code may be called "information bit regular," as shown in FIG. 3. In this case:

$$L_m = \{1 \text{ if } m=q$$

$$\{0 \text{ otherwise.}$$

and $\lambda(x) = x^{q-1}$ and therefore the formula for $R^{opt}(x)$ may be simplified to:

$$R^{opt}(x) = \frac{1 - q(1-x) + (q-1)(1-x)^{q/(q-1)}}{(1-p) + p(1 - q(1-x) + (q-1)(1-x)^{q/(q-1)})}.$$

If all parity check nodes have the same number of edges, then the code may be called "check regular." "Irregular" means each information bit node (or check node) has an unequal number of edges compared to other information bit nodes (or check node).

For most choices of $\lambda(x)$, the optimal parity-check degree sequence may be positive for all finite $i \geq 2$. Since one embodiment of the code will not have parity-check nodes with an infinite number of edges, this distribution may be truncated. Let S be a maximum number of edges that can be attached to a single parity-check node. There may be numerous ways to truncate $R^{opt}(x)$, which may provide good performance. Let the total truncated weight for $R^{opt}(x)$ be:

$$\varepsilon = \sum_{j=S+1}^{\infty} R_j^{opt}.$$

One truncation method places all of the truncated weight on $$R_1^{opt}$$

and may be defined by $$R_1^{opt} = \varepsilon.$$

Another truncation method divides the truncated weight between $$R_1^{opt} \text{ and } R_S^{opt}$$

and may be defined by $$R_1^{opt} = q\varepsilon/(S+q) \text{ and } R_{S+1}^{opt} = S\varepsilon/(S+q).$$

The second truncation method may also be tuned based on the block length of the code.

Another truncation method is defined by $$R_{S+1}^{opt} = \varepsilon$$

and this requires that a small fraction of the information bits are also transmitted to get decoding started.

Figure 7:
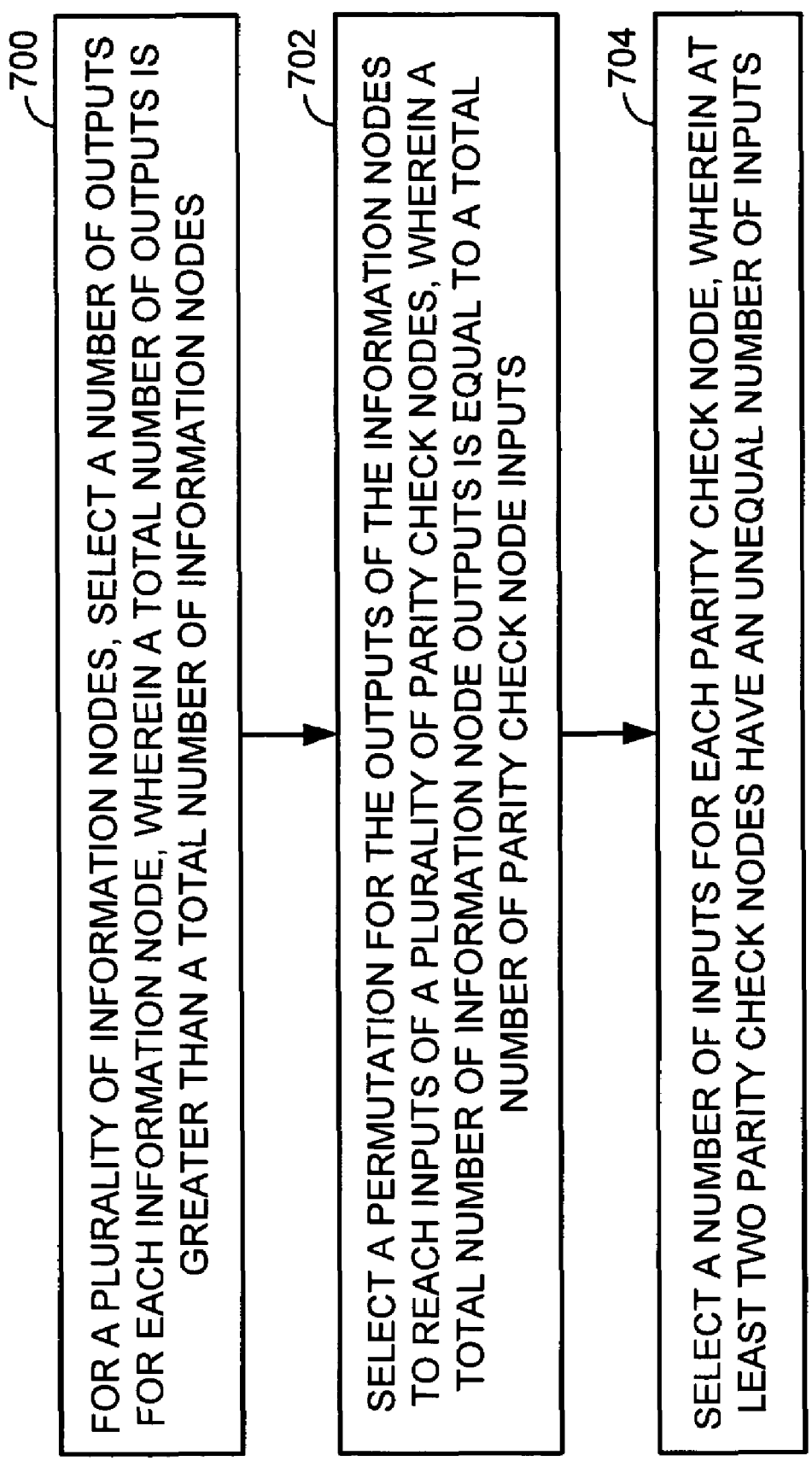
FIG. 7 illustrates a method of configuring an information encoder of FIG. 1.

FIG. 7 illustrates a method of configuring the information encoder 102 of FIG. 1. In block 700, for a plurality of information nodes, the method selects a number of outputs for each information node, wherein a total number of outputs is greater than a total number of information nodes. In block 702, the method selects a permutation for the outputs of the information nodes to reach inputs of a plurality of parity check nodes, wherein a total number of information node outputs is equal to a total number of parity check node inputs. In block 704, the method selects a number of inputs for each parity check node, wherein at least two parity check nodes have an unequal number of inputs.

Each node and each edge in FIGS. 1-6C can represent a vector or group of bits, i.e., a symbol. For example, a symbol may comprise 2048 bits. One of ordinary skill in the art would understand how to implement the graphs described above for encoding and decoding symbols.

Appendix A describes mathematical proofs of properties for codes described herein.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC and the ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of configuring an information encoder, the method comprising:
    for a plurality of information nodes, configuring a number of outputs for each information node such that a total number of outputs from the information nodes is greater than a total number of information nodes;
    configuring a permutation for the outputs of the information nodes to reach inputs of a plurality of parity check nodes, wherein a total number of information node outputs is equal to a total number of parity check node inputs; and
    configuring a number of inputs for each parity check node such that at least two parity check nodes have an unequal number of inputs, and configuring a number of parity check node outputs operable to output a plurality of code bits.

2. The method of claim 1, wherein configuring the number of outputs for each information node comprises designating all information node to have an equal number of outputs.

3. The method of claim 1, wherein configuring the number of outputs for each information node comprises designating at least two information nodes with an unequal number of inputs.

4. The method of claim 1, wherein the parity check nodes comprise even parity check nodes.

5. The method of claim 1, wherein the parity check nodes comprise odd parity check nodes.

6. The method of claim 1, wherein the permutation is random.

7. The method of claim 1, wherein the permutation is pseudo-random.

8. The method of claim 1, wherein a number of parity check nodes is greater than a number of information nodes.

9. The method of claim 1, wherein configuring a number of inputs for each parity check node is based on a distribution of information nodes with different numbers of outputs.

10. The method of claim 1, wherein configuring a number of inputs for each parity check node is based on solving an optimal degree distribution polynomial $$R^{opt}(x) = \frac{1}{p} \frac{\frac{p}{1-p} h(x)}{1 + \frac{p}{1-p} h(x)},$$

corresponding to $R_t$, which is a fraction of parity check nodes with t inputs attached to the information nodes, where $$\rho(x) = R'(x)/R'(1),$$

$$R'(x) = \sum_{t \geq 1} t R_t x^{t-1},$$

$$L'(x) = \sum_{m \geq 1} m L_m x^{m-1},$$

$$\lambda(x) = L'(x)/L'(1), \text{ and}$$

$$h(x) = \frac{\int_0^x (1 - \lambda^{-1}(1-t)) dt}{\int_0^1 (1 - \lambda^{-1}(1-t)) dt}.$$

11. The method of claim 10, wherein $R^{opt(x)}$ is simplified to $\lambda(x) = x^{q-1}$ and $$R^{opt}(x) = \frac{1 - q(1-x) + (q-1)(1-x)^{q/(q-1)}}{(1-p) + p(1 - q(1-x) + (q-1)(1-x)^{q/(q-1)})}.$$

12. A method of encoding, the method comprising:
    inputting a plurality of information symbols to a plurality of information nodes, one symbol per information node, where each symbol comprises at least one bit;
    at each information node, outputting the information symbol one or more times, wherein a total number of outputs from the information nodes is greater than a total number of information nodes;
    transferring the outputs of the information nodes to a plurality of parity check nodes, wherein a total number of information node outputs is equal to a total number of parity check node inputs, wherein at least two parity check nodes have an unequal number of inputs; and
    outputting values from the plurality of parity check nodes.

13. The method of claim 12, farther comprising:
    accumulating output values from the parity check nodes at a plurality of code bit nodes; and
    sending values from the code bit nodes to the parity check nodes.

14. The method of claim 12, wherein all information nodes have an equal number of outputs.

15. The method of claim 12, wherein at least two information nodes have an unequal number of inputs.

16. The method of claim 12, wherein transferring the outputs of the information nodes to a plurality of parity check nodes uses a randomly selected permutation.

17. The method of claim 12, wherein a number of parity check nodes is greater than a number of information nodes.

18. A method of decoding received symbols, the method comprising:
    inputting a sequence of received symbols and erased symbols to a set of code bit nodes, where each symbol comprises at least one bit;
    sending the received symbols from the code bit nodes to a set of parity check nodes and removing connections between the code bit nodes and the parity check nodes;
    changing a parity state of each parity check node that receives a first type of value of the received symbols;
    for each parity check node with only one remaining connection, sending the received symbol from the parity check node across a permutation unit to an information bit node;

sending received symbols from information bit nodes across the permutation unit to selected parity check nodes; and generating a sequence of decoded symbols.

19. The encoder of claim 12, wherein a number of parity check nodes is greater than a number of information nodes.

20. A method of decoding received symbols, the method comprising:

inputting a sequence of received symbols and erased symbols to a set code bit nodes, where each symbol comprises at least one bit;

sending the received symbols from the code bit nodes to a set parity check nodes and removing connections between the code bit nodes and the parity check nodes;

changing a parity state of each parity check node that receives a first type of value of the received symbols;

for each parity check node with only one remaining connection, sending the received symbol from the parity check node across a permutation unit to an information bit node;

sending received symbols from information bit nodes across the permutation unit to selected parity check nodes; and generating a sequence of decoded symbols.

21. The method of claim 20, wherein the first type of value is 1, and each parity check node is changed from an even parity check node to an odd parity check node.

22. An apparatus comprising:

an encoder configured to encode a plurality of information symbols to code symbols, the encoder being configured to:

receive a plurality of information symbols at a plurality of information nodes, one symbol per information node, where each symbol comprises at least one bit;

at each information node, output the information nodes is greater than a total number of information nodes;

transfer the outputs of the information nodes to a plurality of parity check nodes, wherein a total number of information node outputs is equal to a total number of parity chech node inputs, wherein at least two parity check nodes have an unequal number of inputs; and output code symbols from the plurality of parity check nodes.

23. The apparatus of claim 22, wherein the encoder comprises a processor executing instructions stored in a memory.

24. The apparatus of claim 22, wherein the encoder comprises an application specific integrated circuit.

25. An apparatus for configuring an information encoder, comprising:

for a plurality of information nodes, means for configuring a number of outputs for each information node such that a total number of outputs from the information nodes is greater than a total number of information nodes;

means for configuring a permutation for the outputs of the information nodes to reach inputs of a plurality of parity check nodes, wherein a total number of infromation node outputs is equal to a total number of parity check node inputs; and means for configuring a number of inputs for each parity check node such that at least two parity check nodes have an unequal number of inputs, and means for configuring a number of parity check node outputs operable to output a plurality of code bits.

26. The apparatus of claim 25, wherein the means for configuring the number of outputs for each information node comprises means for designating all information node to have an equal number of outputs.

27. The apparatus of claim 25, wherein the means for configuring the number of outputs fopr each information node comprises means for designating at least two information nodes with an unequal number of inputs.

28. The apparatus of claim 25, wherein the parity check nodes comprise even parity check nodes.

29. The apparatus of claim 25, wherein the parity check nodes comprise odd parity check nodes.

30. The apparatus of claim 25, wherein the permutation is random.

31. The apparatus of claim 25, wherein the permutation is pseudo-random.

32. The apparatus of claim 25, wherein a number of parity check nodes is greater than a number of information nodes.

33. The apparatus of claim 25, wherein the means for configuring a number of inputs for each parity check node is based on a distribution of information nodes with different numbers of outputs.

34. The apparatus of claim 25, wherein the means for configuring a number of inputs for each parity check node is based on solving an optimal degree distribution polynomial $$R^{opt}(x) = \frac{1}{p} \frac{\frac{p}{1-p} h(x)}{1 + \frac{p}{1-p} h(x)},$$

corresponding to $R_t$, which is a fraction of parity check nodes with t inputs attached to the information nodes, where $$\rho(x) = R'(x)/R'(1),$$
$$R'(x) = \sum_{t \geq 1} t R_t x^{t-1},$$
$$L'(x) = \sum_{m \geq 1} mL_m x^{m-1},$$
$$\lambda(x) = L'(x)/L'(1), \text{ and}$$
$$h(x) = \frac{\int_0^x (1 - \lambda^{-1}(1-t)) dt}{\int_0^1 (1 - \lambda^{-1}(1-t)) dt}.$$

35. The apparatus of claim 34, wherein $R^{opy(x)}$ is simplified to $\lambda(x) = x^{q-1}$ and $$R^{opt}(x) = \frac{1 - q(1-x) + (q-1)(1-x)^{q/(q-1)}}{(1-p) + p(1 - q(1-x) + (q-1)(1-x)^{q/(q-1)})}.$$

36. An encoder, comprising:

means for inputting a plurality of information symbols to a plurality of information nodes, one symbol per information node, where each symbol comprises at least one bit;

at each information node, means for outputting the information symbol one or more times, wherein a total number of outputs from the information nodes is greater than a total number of information nodes;

means for transferring the outputs of the information nodes to a plurality of parity check nodes, wherein a total number of information node outputs is equal to a total number of parity check node inputs, wherein at least two parity check nodes have an unequal number of inputs; and means for outputting values from the plurality of parity check nodes.

37. The encoder of claim 36, further comprising:
means for accumulating output values from the parity check nodes at a plurality of code bit nodes; and
means for sending values from the code bit nodes to the parity check nodes.

38. The encoder of claim 36, wherein all information nodes have an equal number of outputs.

39. The encoder of claim 36, wherein at least two information nodes have an unequal number of inputs.

40. An apparatus for decoding received symbols, comprising:
means for inputting a sequence of received symbols and erased symbols to a set of code bit nodes, where each symbol comprises at least one bit;
means for sending the received symbols from the code bit nodes to a set of parity check nodes and removing connections between the code bit nodes and the parity check nodes;
means for changing a parity state of each parity check node that receives a first type of value of the received symbols;
for each parity check node with only one remaining connection, means for sending the received symbol from the parity check node across a permutation unit to an information bit node;
means for sending received symbols from information bit nodes across the permutation unit to selected parity check nodes; and
means for generating a sequence of decoded symbols.

41. The apparatus of claim 40, wherein the first type of value is 1, and each parity check node is changed from an even parity check node to an odd parity check node.

42. A computer-storage medium comprising instructions when executed by a processor to perform encoding, the instructions comprising code for:
inputting a plurality of information symbols to a plurality of information nodes, one symbol per information node, where each symbol comprises at least one bit;
at each information node, outputting the information symbol one or more times, wherein a total number of outputs from the information nodes is greater than a total number of information nodes;
transferring the outputs of the information nodes to a plurality of parity check nodes, wherein a total number of information node outputs is equal to a total number of parity check node inputs, wherein at least two parity check nodes have an unequal number of inputs; and
outputting values from the plurality of parity check nodes.

43. The computer-storage medium of claim 42, wherein the instructions further comprise code for:
accumulating output values from the parity check nodes at a plurality of code bit nodes; and
sending values from the code bit nodes to the parity check nodes.

44. The computer-storage medium of claim 42, wherein all information nodes have an equal number of outputs.

45. The computer-storage medium of claim 42, wherein at least two information nodes have an unequal number of inputs.

46. The computer-storage medium of claim 42, wherein transferring the outputs of the information nodes to a plurality of parity check nodes uses a randomly selected permutation.

47. The computer-storage medium of claim 42, wherein a number of parity check nodes is greater than a number of information nodes.

48. A computer-storage medium comprising instructions when executed by a processor to perform encoding received symbols, the instructions comprising code for:
inputting a sequence of received symbols and erased symbols to a set of code bit nodes, where each symbol comprises at least one bit;
sending the received symbols from the code bit nodes to a set of parity check nodes and removing connections between the code bit nodes and the parity check nodes;
changing a parity state of each parity check node that receives a first type of value of the received symbols;
for each parity check node with only one remaining connection, sending the received symbol from the parity check node across a permutation unit to an information bit node;
sending received symbols from information bit nodes across the permutation unit to selected parity check nodes; and
generating a sequence of decoded symbols.

* * * * *